United States Patent

[11] 3,629,587

[72] Inventor Jean A. Decupper
   Neuilly, France
[21] Appl. No. 847,366
[22] Filed Aug. 4, 1969
[45] Patented Dec. 21, 1971
[73] Assignee Detec S.A.
   Geneva, Place Cornavin, Switzerland
[32] Priorities Aug. 5, 1968
[33] Switzerland
[31] 11783/68;
   June 4, 1969, France, No. 6918367

[54] DEVICE FOR MEASURING THE GERMICIDAL ACTION OF ULTRAVIOLET RADIATION
7 Claims, 4 Drawing Figs.
[52] U.S. Cl .................................................. 250/83.3 UV,
   250/86
[51] Int. Cl ..................................................... G01j 1/22
[50] Field of Search ........................................... 250/83.3
   UV, 86, 105; 350/1

[56] References Cited
UNITED STATES PATENTS
2,856,539  10/1958  Orthuber et al. ..............  250/105 X
3,491,234  1/1970  Wiltrout ....................... 250/83.3 UV X
OTHER REFERENCES
A Small and Inexpensive Ultraviolet Dose-Rate Meter Useful in Biological Experiments, by John Jagger, from Radiation Research, Vol. 14, No. 4, April 1961, pgs. 394– 403.

Primary Examiner—Archie R. Borchelt
Attorneys—Robert E. Burns and Emmanuel J. Lobato ABSTRACT: In a device for testing the germicidal action of an ultraviolet ray tube, a photoelectric cell receives from the tube only radiation centered on the 2,537 A. line and its output is amplified to actuate an optical or acoustic signal which indicates when the energy of the radiation is below a predetermined threshold level. To prevent damage to the cell, a shutter is interposed between the tube and the cell and is withdrawn when a test is to be made.

DEVICE FOR MEASURING THE GERMICIDAL ACTION OF ULTRAVIOLET RADIATION

Ultraviolet radiation which, as is known, is situated in the spectrum beyond the violet, comprises radiation of wavelength between approximately 4,000 A. and 200 A.

As is well known, ultraviolet rays have a destructive action on living tissue and considerable bactericidal power.

The latter property is very often used in hospitals, in the form of an ultraviolet ray tube. The tube forms part of relatively complex apparatus which is placed in the rooms to be disinfected, the tube acting directly if the room is unoccupied and indirectly if the room is occupied by people.

The most effective bactericidal action is due to a radiation band centered on the 2,537 A. line.

Ultraviolet ray tubes lose their efficiency after a time, partly because of a screen of dust deposited on them, but mainly because of ageing; although they still emit ultraviolet radiation, little or none of the radiation may be in the band centered on the 2,537 A. line. The tube still operates, but has little or no germicidal action, because the energy of radiation centered on the 2,537 A. line is zero or is below the limits indicated by the manufacturers of the tube. The tube then has to be replaced.

The user, however, has no means of measuring the germicidal efficiency of the tube which he is using.

The present invention proposes a reliable, effective and cheap method of periodically testing the germicidal effectiveness of the tube.

The invention provides a device for measuring the germicidal effectiveness of an ultraviolet ray tube and comprises a photoelectric cell associated with means which pass only radiation centered on the 2,537 A. line; an amplifier for amplifying the signal emitted by the photoelectric cell, and means for using the signal supplied by the amplifier to actuate a device providing e.g. optical or acoustic signals; the device may be arranged to act if the ultraviolet radiation falling on the cell and comprising ultraviolet radiation centered on the 2,537 A. line has energy above or below a given threshold.

Advantageously, the means associated with the photoelectric cell comprise one or more interference filters having a passband centered on the 2,537 A. line.

To prevent the photoelectric cell from being constantly exposed to ultraviolet radiations which would eventually reduce its sensitivity, a shutter is disposed between the ultraviolet tube and the cell, means being provided for retracting the shutter from the cell for sufficient time to make the test measurement.

In a preferred embodiment, the amplifier receiving and amplifying the signal emitted by the photoelectric cell is a transistor amplifier whose base is energized by a signal emitted by the cell, the transistor actuating an electromagnetic relay disposed in the circuit of the signalling device, which can be a neon lamp whose terminals are connected to a multivibrator giving a blinker light signal.

The device forms a compact unit and can be closely associated with the apparatus containing the ultraviolet ray tube.

Three embodiments of the device according to the invention are described hereinafter by way of example and are shown in the accompanying drawings, in which.

Figure 1:
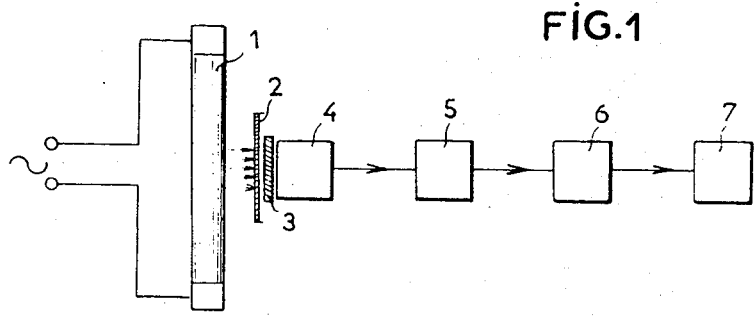
FIG. 1 is a block diagram of the device.

In the block diagram in FIG. 1, a tube 1 emits ultraviolet radiation. A shutter 2, in the position shown, intercepts the ultraviolet radiation and prevents it from passing through an interference filter 3 associated with photoelectric cell 4 and adapted to pass only a band of ultraviolet radiation centered on the 2,537 A. line. An amplifier 5, a multivibrator 6 and an optical or acoustic signalling device 7 are disposed downstream of the photoelectric cell.

The shutter 2 can be retracted to release the ultraviolet radiation. In this latter position, it allows the radiation to travel towards the interference filter 3 which passes only a radiation band centering on the 2,537 A. line, which is alone received by the photoelectric cell. The cell then emits a signal which depends on the energy of the incident radiation and which, after amplification by amplifier 5, actuates the multivibrator which actuates the signalling device 7 if the energy of the ultraviolet radiation is above a certain threshold if it is not, the signalling device does not operate and the user knows that the tube no longer has an effective germicidal action.

Figure 2:
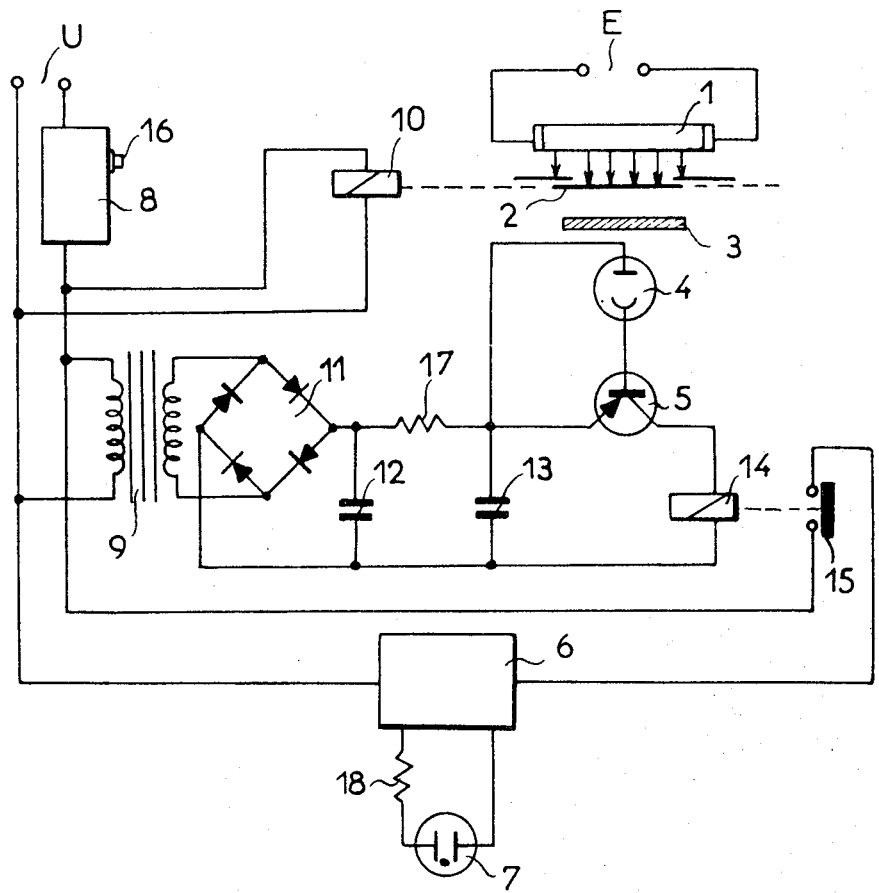

FIG. 2 shows an embodiment of the device according to the invention. The device comprises, firstly, a voltage supply U, a pushbutton 16 forming part of a timing mechanism 8 which can trigger a control circuit for a period of 1 to 5 minutes; a voltage-reducing transformer 9, an electromagnet 10 having an adjustable core, a shutter 2, a rectifier cell 11, two filter capacitors 12, 13 and a resistor 17. The photoelectric cell 4 collects the radiation, which passes through filter 3 which admits only radiation centered on the 2,537 A. line. The device in FIG. 2 also comprises a transistor 5, a relay 14 acting on a contact 15, multivibrator 6, and an indicator 7 protected by a resistor 18.

When the user wishes to test the tube 1, he presses button 16 which actuates timing device 8 and energizes transformer 9 and electromagnet 10, which acts on shutter 2 and retracts it from the path of the rays coming from tube 1, since the photoelectric cell 4 should not be continuously exposed to the source of light or it may be worn out. Transistor 5 is conducting when the limiting threshold of the ultraviolet energy centered on the 2,537 A. line is not reached; consequently, if tube 1 is not in good condition, transistor 5 becomes conducting, placing relay 14 under load, contact 15 closes and multivibrator 6 can operate and supply signals to indicator 7, which comprises a neon lamp. Indicator 7, comprising a neon lamp, gives intermittent light signals. Note that is indicator can equally well be designed to give acoustic signals.

Figure 3:
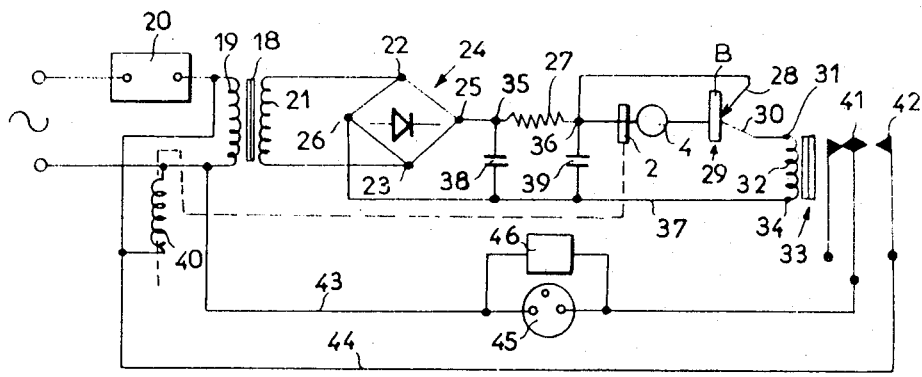
FIGS. 2, 3 and 4 are diagrams of three embodiments of a device according to the invention, in conformity with the block diagram.

FIG. 3 gives a detailed electric circuit of another embodiment of the device according to the invention.

The primary winding 19 of a supply transformer 18 is powered from the mains via a timing device 20. The secondary winding 21 of transformer 18 is connected to the terminals 22 and 23 of a bridge rectifier denoted by the general reference 24 and having two other terminals denoted by 25 and 26. The emitter 28 of a transistor denoted by the general reference 29 is connected to terminal 25 by a resistor 27. The collector 30 of transistor 29 is connected to one terminal 31 of the coil 32 of an electromagnetic relay denoted by the general reference 33 and having another terminal 34 connected to the terminal 26 of the bridge rectifier 24. Two filter capacitors 38 and 39 are mounted between terminals 35 and 36 of resistor 27 and conductor 27 connecting the terminal 34 of relay 33 to the terminal 26 of bridge rectifier 24.

The photoelectric cell 4 comprises one or more interference filters, and the shutter 2 is disposed in front of the cell and stops the ultraviolet radiation from the ultraviolet tube (not shown) or allows the radiation to pass towards cell 4, which actuates the base B of transistor 29.

The shutter is supported by the adjustable core of a coil 40 supplied by the mains downstream of the timing device and actuated by a press-button (not shown).

The two contacts 41 and 42 of relay 33 are connected by conductors 43 and 44 respectively to the terminals of primary winding 19, a neon lamp 45 being mounted in the conductor 43 and a multivibrator 46 being mounted in parallel on the lamp.

The device which has been described operates as follows:

It is assumed that the ultraviolet tube is connected and that its radiation is prevented, at the beginning, from illuminating cell 4 associated with the interference filter by diaphragm 2.

If it is desired to make a test, the timing mechanism 20 is actuated and the transformer is energized; current is prevented from flowing in the circuit connected between terminals 25 and 26 of bridge rectifier 24 and containing transistor 29, and the transistor is blocked so that no voltage appears at terminals 31 and 34 of the winding of relay 33, whose contacts 41 and 42 remain inoperative. Consequently, no current flows in the circuit of conductors 43 and 44, and lamp 45 does not go on.

If the adjustable core coil 40 is actuated, the shutter is retracted from the beam of ultraviolet radiation which passes through one or more interference filters which admit a band centered on the 2,537 A. line. The ultraviolet radiation illuminates the cell with radiation in the aforesaid band so that cell 4 emits a signal corresponding to the energy of the incident radiation. If the radiation is too weak and is below a given threshold to which the cell has been adjusted, the signal emitted by the cell and energizing the base B is insufficient to make the transistor conduct. Lamp 45 is not ignited, and the user thus knows that the ultraviolet tube has a defective germicidal action.

If, on the other hand, the energy of the incident radiation on the cell is above the threshold, the signal emitted by the cell energizes the base B of transistor 29 which conducts. A current when flows through coil 32 of relay 33; contact 41–42 closes and lamp 45 illuminates and blinks owing to the presence of multivibrator 46.

The user accordingly knows that his tube is still effective, and he can return the device to its inoperative position by inserting diaphragm 2 into the ultraviolet radiation thus sparing the cell 4. The supply transformer is automatically disconnected and isolates device from the mains.

Obviously, the presence of multivibrator 46 is not necessary. If there is no multivibrator 46, the signal will be a permanent optical signal instead of a blinker light.

Figure 4:
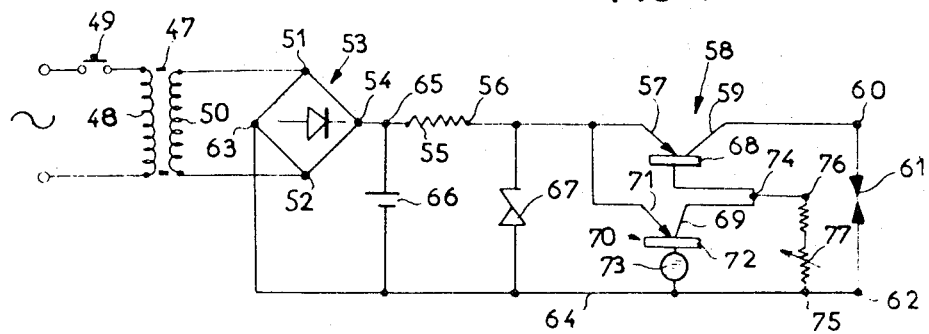

Another embodiment of the invention is shown in FIG. 4, in which the ultraviolet tube, the diaphragm and its control coil have been omitted for clarity.

In FIG. 4, a transformer 47 has a primary winding 48 connected to the mains, its supply being monitored by a press-button 49. The secondary winding 50 of the transformer is connected to the terminals 51 and 52 of a bridge rectifier denoted by the general reference 53. A resistance 55, connected to the terminal 54 of rectifier 53, has a terminal 56 to which is connected the emitter 57 of a first transistor denoted by the general reference 58 and having a collector 59 connected to the terminal 60 of an optical or acoustic signalling device 61. The other end 62 of the signalling device is connected to the terminal 63 of the bridge rectifier 53 by a conductor 64.

A filtering capacitor 66 is connected between the terminal 65 of resistor 55 and conductor 64, and a Zener diode 67 used for stabilization is connected between terminal 56 and the same conductor.

The base 68 of the transistor is connected to the collector 69 of a second transistor denoted by the general reference 70 and having an emitter 71 connected to the emitter 57 of transistor 58. The base 72 of transistor 70 is connected to one terminal of photoelectric cell 73, the other terminal of which is connected to conductor 64.

Finally, a parallel circuit comprising a fixed resistor 76 in series with a potentiometer 77 is connected between an intermediate point 74 on the circuit connecting the base 68 of transistor 58 to collector 69 of transistor 70, and a point 75 on conductor 64 situated downstream of photoelectric cell 63.

In principle, the device operates in the same manner as the device in FIG. 2.

When the photoelectric cell, comprising one or more interference filters as defined heretofore, admits ultraviolet violet radiation entered on the 2,537 A. line having sufficient energy, equal or substantially equal to that indicated by the manufacturer of the ultraviolet tube so as to characterize its efficient germicidal properties, the signal emitted by the cell blocks the two transistors, and no warning signal is given by the signalling device.

If the energy is lower than a certain threshold, the signal emitted by the cell causes the two transistors 58 and 70 to become conducting, and the signalling device gives an alarm signal.

The potentiometer 77 can modify the threshold, which can also be modified by providing a number of photoelectric cells and means for connecting a number of cells in parallel.

It should also be noted that the devices described can be actuated if necessary so that the optical or acoustic signalling means operate as long as the ultraviolet tube is emitting sufficient energy in ultraviolet radiation centered on the 2,537 A. line, but do not emit any signal when the energy is insufficient for the type to be considered as having a germicidal action.

I claim:

1. A device for testing the germicidal action of radiation emitted by an ultraviolet ray tube comprising, a photoelectric cell, an interference filter disposed in use between an ultraviolet ray tube to be tested and said photoelectric cell, said interference filter having a passband centered on the 2,537 A. line thereby to pass only radiation centered on said 2,537 A. line, an amplifier amplifying a signal output of said photoelectric cell emitted only when the radiation transmitted by said filter and detected by said photoelectric cell is of a wavelength of 2,527 A., and signal means energized and actuated by the amplified output of said photoelectric cell to indicate said ultraviolet ray tube is emitting radiation having a wavelength of 2,537 A.

2. a device for testing the germicidal action of radiation emitted by an ultraviolet ray tube according to claim 1, in which said signal means comprises a neon lamp.

3. A device for testing the germicidal action of radiation emitted by an ultraviolet ray tube according to claim 1, in which said signal means comprises an acoustic device.

4. A device for testing the germicidal action of radiation emitted by an ultraviolet ray tube according to claim 1, in which said amplifier comprises a transistor amplifier having a base energized by said signal output of said photoelectric cell, and including an electromagnetic relay actuated by said amplifier output for controlling said signal means.

5. A device for testing the germicidal action of radiation emitted by an ultraviolet ray tube according to claim 1, in which said signal means comprises means indicating said ultraviolet ray tube is emitting radiation having a wavelength of 2,537 A. only when said amplified output exceeds a selected threshold value.

6. Apparatus for testing the germicidal action of ultraviolet radiation comprising, an ultraviolet ray tube, a photoelectric cell, an interference filter disposed between said ultraviolet ray tube and said photoelectric cell, said interference filter having a pass band centered on the 2,537 A. line thereby to pass only radiation centered on said 2,537 A. line, an amplifier amplifying a signal output of said photoelectric cell emitted only when the radiation transmitted by said filter and detected by said photoelectric cell is of a wavelength of 2,537 A, and signal means energized and activated by the amplified output of said photoelectric cell to indicate said ultraviolet ray tube is emitting radiation having a wavelength of 2,537 A.

7. Apparatus for testing the germicidal action of ultraviolet radiation according to claim 6, including a shutter disposed between said ultraviolet ray tube and said photoelectric cell, and means for retracting said shutter from between said ultraviolet ray tube and said photoelectric cell.

* * * * *